United States Patent [19]
Flint

[11] 3,970,395
[45] July 20, 1976

[54] HOT-MELT ADHESIVE WITH SELF-MELTING CAPABILITY

[76] Inventor: Theodore R. Flint, Jug Hollow Road, Valley Forge, Pa. 19481

[22] Filed: July 2, 1975

[21] Appl. No.: 592,468

[52] U.S. Cl. .............................. 401/1; 222/146 H
[51] Int. Cl.² ...................... B43M 1/02; B67D 5/62
[58] Field of Search ................... 222/146 H, 146 R; 401/1, 2

[56] References Cited
FOREIGN PATENTS OR APPLICATIONS
261,407  8/1949  Switzerland ............................ 401/1

Primary Examiner—Allen N. Knowles
Assistant Examiner—Hadd S. Lane
Attorney, Agent, or Firm—Howson and Howson

[57] ABSTRACT

A hot-melt adhesive with controllable self-melting capability comprising an adhesive composition and a pyrotechnic composition coextensively joined forming an integral self-supporting unit is disclosed. A method of forming an adhesive bond or seal with the hot-melt adhesive is also disclosed.

2 Claims, 7 Drawing Figures

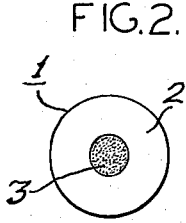
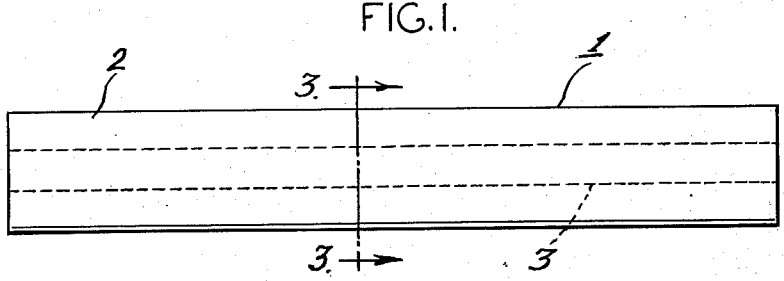
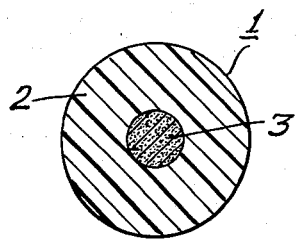
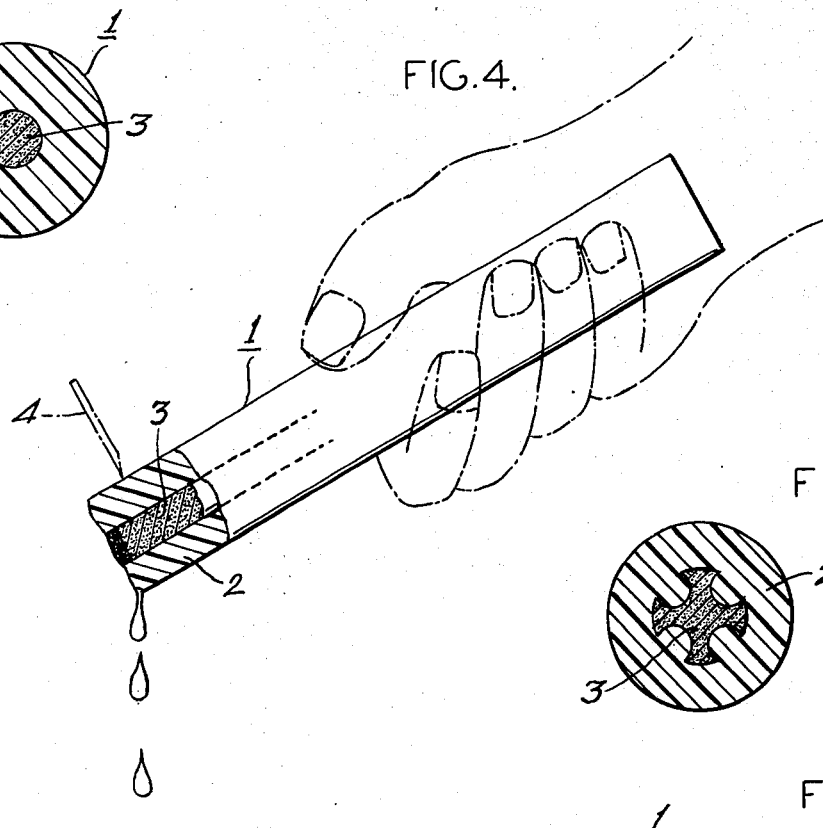
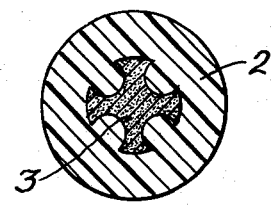
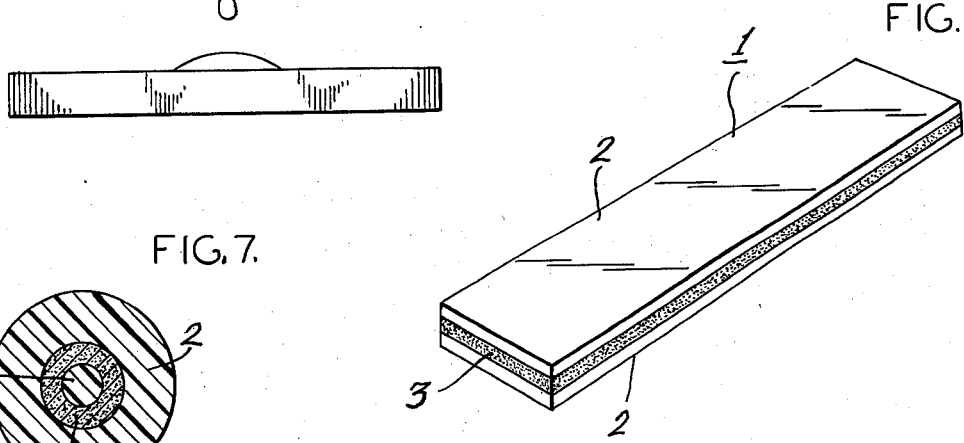
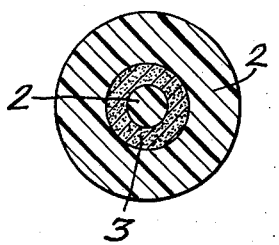

HOT-MELT ADHESIVE WITH SELF-MELTING CAPABILITY

BACKGROUND OF THE INVENTION

Adhesives exist in many forms, from typical liquids which turn to solids between the surfaces to be joined, to a special class known as hot-melt adhesives. Hot-melt adhesives are those which can be melted and applied in molten form to a body to be held to another body. Bond strength develops merely by cooling the molten adhesive to the solid state.

Hot-melt adhesives presently available are not convenient to use since they require both means to heat the adhesive to the melting point and means to apply the molten adhesive to the work piece. Various apparatus which place a hot-melt adhesive in proximity with heating means have been developed and are shown in U.S. Pat. No. 3,505,261, for example. Such apparatus, of course, greatly increases the cost of use of hot-melt adhesives and limits the use of hot-melt adhesives to only those locations with electrical outlets since electricity is required to energize the heating element of the melting apparatus. Also, some facility with mechanical apparatus is required to operate the melting apparatus and adhesive supply in a proper manner, another factor limiting the usefulness of such products.

On the other hand, because hot-melt adhesives offer the advantage of being extremely fast-setting and represent a means of applying an adhesive to hard-to-reach areas, there is considerable interest in developing easy-to-use hot-melt adhesives.

It is an object of this invention to provide a hot-melt adhesive with self-melting capability which does not require external heating means, is simple to use and economical to produce, and yet has the well-known attributes of hot-melt adhesives.

DESCRIPTION OF THE INVENTION

This invention relates to an organic hot-melt adhesive with controllable self-melting capability comprising an adhesive composition readily softened by moderate temperatures and a pyrotechnic composition, said adhesive composition and pyrotechnic composition being coextensively joined forming an integral self-supporting unit, combustion of the pyrotechnic composition providing sufficient heat to cause that portion of said adhesive composition coextensive with the burning pyrotechnic composition to melt and flow for application to a work piece, while extinguishing the process of combustion of said pyrotechnic composition leaves the remaining adhesive composition and pyrotechnic composition availble for further use.

In the appended drawings,

FIG. 1 is a side elevational view of the hot-melt adhesive of this invention.

FIG. 2 is an end view of the hot-melt adhesive shown in FIG. 1.

FIG. 3 is an enlarged sectional view taken along lines 3—3 of FIG. 1.

FIG. 4 is a view illustrating use of the hot melt adhesive of FIG. 1, with a portion cut away to show the effect of combustion of the pyrotechnic composition.

FIG. 5 illustrates a modified embodiment of the hot-melt adhesive of FIG. 1.

FIGS. 6 and 7 are enlarged sectional views of FIG. 1 showing modified embodiments of the hot-melt adhesive similar to FIG. 3.

The organic hot-melt adhesive of this invention has two principal components, viz. an organic hot-melt adhesive composition and a pyrotechnic composition. The organic hot-melt adhesive composition is generally comprised of thermoplastic components, e.g. thermoplastic resins, usually in the form of a mixture of one or more components. Useful thermoplastic components for the hot-melt adhesive include hydrocarbon waxes, cellulose esters and ethers, polyvinyl esters and acetals, ethylene vinyl acetate, polyisobutylene, polyethylene, polypropylene, polyester resins, certain polyamides, natural resins and gums and certain elastomers in an uncrosslinked (Unvulcanized state). Thermosetting resins may also be included in the hot-melt adhesive composition. Butyl rubber, because of its tacky nature, is an elastomer useful in hot-melt adhesive formulations.

In addition to the thermoplastic component, the hot-melt adhesive composition will include one or more various additives designed to impart appropriate working properties and finished physical properties to the hot-melt adhesive. For example, fillers, pigments and plasticizers may be, and typically are, included in the hot-melt adhesive composition. Fire retardant materials may also be included in the adhesive composition in proportions ranging from 0 to about 60% based on the weight of the adhesive composition for the purpose of inhibiting any flaming of the adhesive composition during use of the hot-melt adhesive. Useful fire retardant materials are known in the art and include aluminum trihydrate, zinc borate, antimony compounds, inorganic phosphates and antimony compounds with chlorine donating compounds.

In the present instance, the thermoplastic components, plasticizers, fillers and other components making up the hot-melt adhesive composition are selected and combined in a manner so as to provide compositions which can be formed into the desired hot-melt adhesive by extrusion. Generally speaking, the thermoplastic components will comprise from about 30 to about 100% of the hot-melt adhesive, the proportion based on the weight of the adhesive composition.

The adhesive composition is prepared in a form amenable for extrusion by combining and mixing the components preferably with the aid of sufficient heat to cause the thermoplastic components to melt. After intimate admixture of the components is achieved, the molten mixture is cooled and formed into slugs or pellets of a size suitable for later extrusion. The adhesive composition may be stored indefinitely in this form.

The second component of the organic hot-melt adhesive is a pyrotechnic composition. The pyrotechnic composition functions to provide, when burned, sufficient heat to cause that portion of the adhesive composition coextensive with the burning pyrotechnic composition to melt and flow for application to a work piece. The pyrotechnic composition "burns" in the sense that word is used in the present specification and claims, with little or no flame. All that is required when the pyrotechnic composition "burns" is that sufficient heat be provided by the process of combustion to cause the adhesive composition coextensive with that portion of the pyrotechnic composition undergoing the process of combustion to soften or melt to the point where it readily flows.

The pyrotechnic composition is composed of a mixture of ingredients, (e.g. fuels, oxidizers, binders and accessory materials). Fuels are those elements and compounds which enter into strongly exothermic reactions with oxygen, that is, chemically speaking, fuels are reducing agents. Fuels useful in the present instance include mixtures of charcoal and sulfur in varying ratios, magnesium powder, aluminum, silicon, boron, zirconium and titanium. Oxidizers include salts which easily give off oxygen, e.g. nitrates of sodium, potassium, strontium and barium, potassium chlorate and potassium perchlorate. Binders hold the fuel, oxidizer and accessory materials together and may be dextrins, gum arabic, lacquer-type cellulose nitrate and various synthetic, cold polymerizing plastics such as unsaturated polyesters. Accessory materials include agents which provide the pyrotechnic composition with the working and physical properties necessary for inclusion in the hot-melt adhesives of this invention. They include aids to make the powdery substances making up the pyrotechnic composition free flowing to promote intimate mixtures thereof, additives which prevent influx of moisture into the pyrotechnic composition such as waxes and oils. Other combinations of materials which combine chemically producing an exothermic reaction when ignited such as mixtures of finely-divided zinc and sulfur in approximately stoichiometric proportions may also be used as a pyrotechnic composition.

As noted above, the pyrotechnic composition is formulated so that it burns producing little, if any, flame, generating sufficient heat to cause that portion of the adhesive composition coextensive with the pyrotechnic composition undergoing combustion to melt and flow to a work piece. The burning pyrotechnic composition generates temperatures of from about 150° to about 550°F. in the coextensive adhesive composition, such temperatures being sufficient to cause all of the coextensive adhesive composition to melt and flow to a work piece.

The pyrotechnic composition is formulated so that products of combustion thereof are compatible with the molten adhesive composition and do not impart any untoward effects on the appearance, development or strength of the desired adhesive bond.

The components comprising the pyrotechnic composition may be combined in a manner to provide a composition which may be co-extruded with the hot-melt adhesive composition. In this regard, the pyrotechnic composition may initially be in a semi-liquid state and include a thermosetting binder such as a polyurethane composition. When co-extruded with the adhesive composition, the heat generated in the extrusion process is sufficient to cause the thermosetting binder to polymerize causing the semi--liquid pyrotechnic composition to become a stable solid core within the adhesive composition.

The pyrotechnic composition may also be formulated as a "putty-like" solid which may be extruded forming a "wire-like" structure after hardening either by solvent evaporation or by resin crosslinking. The wire-like structure may then be co-extruded with the adhesive composition through a cross-head die forming an organic hot-melt adhesive in which the pyrotechnic composition is present in the core and the adhesive composition is the outer cover or wrap. This latter procedure is analogous to the manner in which electrical wire is coated with vinyl insulating material.

Considering the invention in greater detail in connection with the drawings, FIG. 1 illustrates a hot-melt adhesive (1) in which outer core or envelope 2 is the hot-melt adhesive composition and inner core 3 is the pyrotechnic composition.

To prepare the hot-melt adhesive illustrated in FIG. 1 separate masses, one in the form of slugs or pellets of the organic hot-melt adhesive composition, the other containing the pyrotechnic composition are fed to extrusion apparatus equipped with a co-extrusion die. An integral self-supporting unit in which the organic hot-melt adhesive composition 2 and the pyrotechnic composition 3 are coextensively joined is formed by the extrusion process. The resultant hot-melt adhesive has sufficient flexibility and strength so that the integral unit may be coiled and packaged in any convenient length, including short sticks.

To use the hot-melt adhesive of this invention, as illustrated in FIG. 4, a length of hot-melt adhesive 1 may be hand held and the pyrotechnic composition is ignited. The ratio of organic hot-melt adhesive composition to pyrotechnic composition in the hot-melt adhesive is such that the heat distribution or thermal transfer radiating from the inner core 3 of pyrotechnic composition is sufficient to cause all of the adhesive composition 2 coextensive with the area of combustion of the pyrotechnic composition to be softened or melted and flow to a work piece. Heat transfer engendered by combustion of the pyrotechnic composition should be sufficient to cause all of the adhesive composition coextensive with the areas of combustion to melt, thereby precluding the possibility of melting only a portion of the adhesive composition, leaving an outer tube of unmelted adhesive which could interfere with future use of the organic hot-melt adhesive. A useful hot-melt adhesive is one in which the extruded product 1 has an outside diameter of about ¼ inch and the core of pyrotechnic composition 3 is about ⅛ inch in diameter.

FIGS. 5, 6 and 7 illustrate embodiments in which structural relationship between the organic hot-melt adhesive composition and the pyrotechnic composition are modified as a means of controlling heat transfer from the portion of the pyrotechnic composition 3 undergoing combustion to the coextensive adhesive composition 2. For example, increasing the area of contact between pyrotechnic composition and the coextensive adhesive composition through the somewhat cross-like configuration illustrated in FIG. 6 or the concentric ring configuration illustrated in FIG. 7 may enhance the rate of heat transfer from that portion of pyrotechnic composition undergoing combustion to the coextensive adhesive composition. Other modifications in structure which accomplish the same result are of course possible as may be appreciated by those in the art. A fast-setting, high strength bond is formed when a body is joined with a work piece to which the hot-melt adhesive of the invention has been applied through the simple expediency of cooling of the molten hot-melt adhesive.

Hot-melt adhesives find their most widespread application in small jobs which do not require large amounts of adhesive. Another attribute of the hot-melt adhesive of this invention is that one may use only that amount of hot-melt adhesive which is necessary for a particular application and preserve the remainder of the hot-melt adhesive for future use simply by extinguishing the process of combustion as by cutting the hot-melt adhesive beyond the area of combustion of pyrotechnic composition 3 with cutting means 4 which may be a knife, scissors, etc. Since the pyrotechnic composition is formulated to be slow burning and may be extinguished at will by the expediency just described, a degree of control over the amount of adhesive applied at any one time is achieved.

The following example is set forth as illustrative of the invention:

The following materials were combined in the proportions shown to form the organic hot-melt adhesive composition.

| | Weight Percent |
|---|---|
| Ethylene vinyl acetate copolymer (melt index 70) | 32 |
| Polyisobutylene (avg. molec. wt. 35,000) | 20 |
| Polyethylene (Melt index 70) | 8 |
| Hydrogenated Resin, glycerol ester | 24 |
| Paraffin Wax (Melting point 150–160°F.) | 16 |

The components were intimately mixed and melted together in a jacketed double arm mixer. The molten mixture was cooled and formed into pellets or slugs of elastomeric material suitable for addition to extrusion apparatus. The solid elastomeric adhesive composition was fed to extrusion apparatus as described heretofore where it reached temperatures between about 120° and about 200°F. and under the pressure produced by the extrusion apparatus became molded into a self-supporting outer core structure of adhesive composition.

The following materials were combined in the proportions shown to form the pyrotechnic composition.

| | Weight Percent |
|---|---|
| Ammonium Nitrate | 80 |
| Polypropylene Glycol (Mol. Wt. 1800–1900) | 12 |
| 2,4-Tolylene Diisocyanate (TDI) | 2 |
| Glycerol Monoricinoleate | 1.6 |
| *Squalene | 2.8 |
| Lecithin | 0.14 |
| Phenyl Dibetanaphthylamine | 0.12 |
| Ferric Acetoacetonate | 0.03 |

-continued

| | Weight Percent |
|---|---|
| Copper Chromite | 1 |

*2,6,10,15,19,23-Hexamethyltetracosahexene

A putty-like material suitable for extrusion formed with the in situ development of a polymeric binder which resulted from the reaction of TDI with polyethylene glycol. The resultant putty-like material was then extruded and the heat encountered as the mixture passed through the extrusion apparatus accelerated the cross-linking reaction between TDI and polyethylene glycol to form a self-supporting pyrotechnic composition having a wire-like structure. The wire-like pyrotechnic composition was extruded through cross-head extrusion die simultaneously with extrusion of the hot-melt adhesive composition to form a hot-melt adhesive of the configuration of FIG. 1.

Having thus described the invention, what is claimed is:

1. An organic hot-melt adhesive with controllable self-melting capability comprising an adhesive composition readily melted by moderate temperatures and a pyrotechnic composition, said adhesive composition and pyrotechnic composition being coextensively joined forming an integral self-supporting unit, combustion of the pyrotechnic composition providing sufficient heat to cause that portion of said adhesive composition coextensive with the burning pyrotechnic composition to melt and flow for application to a work piece, while extinguishing the process of combustion of said pyrotechnic composition leaves the remaining adhesive composition and pyrotechnic composition available for further use.

2. The hot-melt adhesive of claim 1 wherein said pyrotechnic composition is of the class wherein said combustion generates temperatures of from about 150° to about 550°F. in the coextensive adhesive composition.

* * * * *